Feb. 25, 1958
G. S. RIDER
2,824,454
ROTARY TO OSCILLATORY MECHANICAL MOVEMENT
Filed April 18, 1955
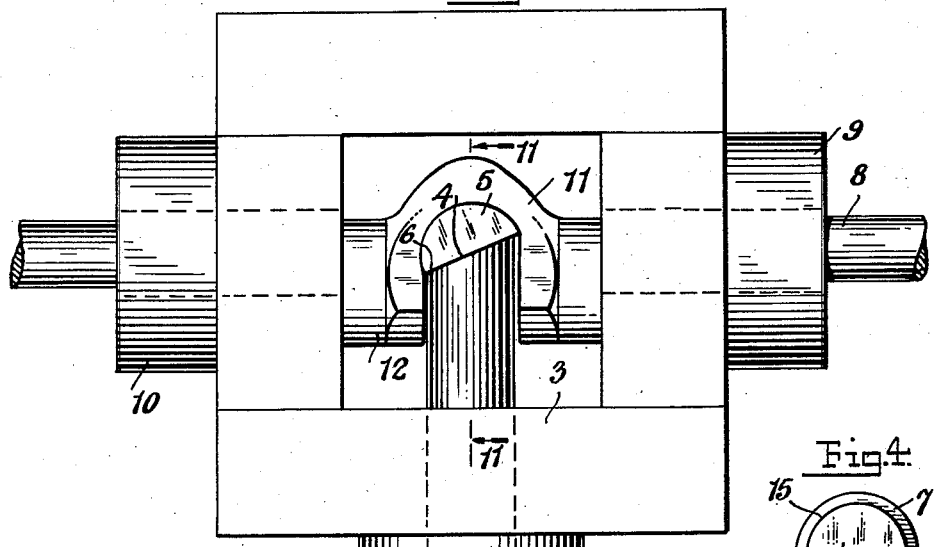
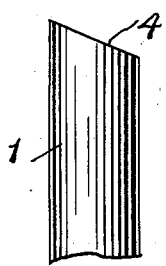
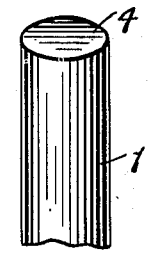
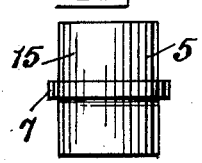
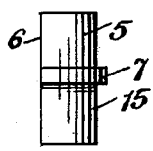
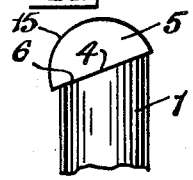
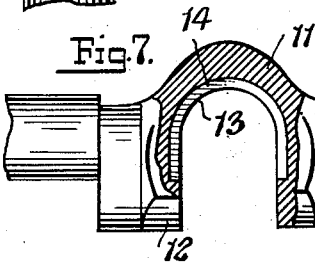
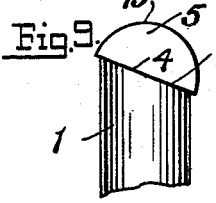
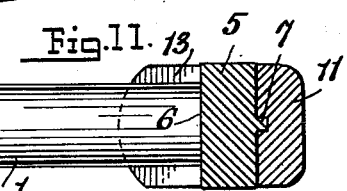
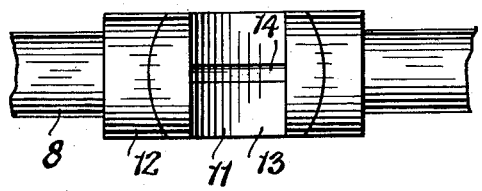
INVENTOR
Granville S. Rider
BY
Harry Radzinsky
ATTORNEY

United States Patent Office 2,824,454
Patented Feb. 25, 1958

2,824,454

ROTARY TO OSCILLATORY MECHANICAL MOVEMENT

Granville S. Rider, Los Angeles, Calif., assignor of one-half to George I. Wahnish, Hermosa Beach, Calif.

Application April 18, 1955, Serial No. 501,839

7 Claims. (Cl. 74—48)

This invention relates to mechanical movements, and more particularly to a type wherein the rotative movement of a shaft or similar rotative element is translated into an oscillating movement that is imparted to a co-operating element.

It is an object of the present invention to provide a device of this character in which lost motion, play, looseness of fit between co-operating elements, backlash and other undesirable characteristics often found in various types of mechanical movements will be eliminated. It is another object of the invention to provide a mechanical movement by which oscillations of an element can be obtained from a rotative shaft and with a minimum of vibration; with minimum of wear between the parts, and with the use of relatively few parts and which will be of long life.

It is another object of the invention to provide a mechanical movement from which oscillations in several directions can be obtained from a single rotative element such as a rotary shaft. A mechanical movement as herein described is useful in a multitude of mechanical arrangements, devices and apparatus as will be apparent to those skilled in mechanical arts.

With these objects, and other objects to be hereinafter set forth in view, I have devised the arrangement of parts to be described and more particularly pointed out in the claims appended hereto.

In the accompanying drawing forming a part hereof, and in which an illustrative embodiment of the invention is disclosed, Fig. 1 is a top plan view of a mechanical movement constructed in accordance with the invention;

Fig. 2 is a view of the inclined end or cam portion of the rotary shaft forming a part of the improved mechanical movement;

Fig. 3 is a view of said rotated shaft, taken at right angles to Fig. 2;

Fig. 4 is a top plan view of the semi-cylindrical or half-round driving element or dog that is actuated by the rotary shaft;

Fig. 5 is a side view of the half-round driving element or dog;

Fig. 6 is a view looking at the cylindrical or convex surface of the driving element;

Fig. 7 is a plan view of the crank or loop portion of the oscillating shaft, with a part in section;

Fig. 8 is a front elevation of the oscillating shaft shown in Fig. 7;

Fig. 9 shows one position of the half-round driving element or dog during rotation of the rotary shaft;

Fig. 10 shows another position of the driving element, and

Fig. 11 is a sectional view, taken substantially on the line 11—11 of Fig. 1, looking in the direction of the arrows.

Referring to the drawing, 3 indicates a frame which is shown as being rectangular and in which parts of the improved mechanical movement are mounted to most clearly indicate the operation of the same. At 1 is shown a rotated shaft, which may be an extension from an electric motor from a gear box, or may be otherwise rotatively driven at a suitable speed by any known means. Said shaft 1 is mounted for rotation in any suitable type of bearing generally indicated at 2, and which shall be one to permit of easy and smooth rotation of the shaft while maintaining the same against any material axial movement through the bearing 2 or frame 3. This result can be obtained by suitable thrust bearings of known construction.

At its forward end, the rotating shaft 1 is formed or otherwise provided with an inclined or angular cam surface as indicated at 4. While the shaft 1 is rotated, this inclined cam surface 4 is maintained in constant intimate contact with, and is rotatively operative against, the flat face 4 of a half-round or semi-cylindrical driving element or dog shown at 5. Such driving element constitutes a dog having a cylindrical surface or convex face 15 which closely fits within a complementary or arcuate concavity 13 provided in a loop portion or crank part 11 on an oscillating shaft 8.

The oscillating shaft 8 is mounted for oscillatory or pivotal reciprocatory movement in the bearings generally indicated at 9 and 10. Like the bearing 2, the bearings 9 and 10 may be of known type which will permit of the smooth oscillatory movement of the shaft 8 while preventing any axial movement of such shaft. Formed on and extending radially from the cylindrical surface 15 of the driving element or dog 5 is an arcuate flange 7 which fits within and is guided in a complementary groove 14 formed in the concavity 13 of the loop portion or crank 11. This arrangement is such as to permit oscillatory sliding movement of the driving member or dog 5 within the concavity 13 around a vertical axis, as viewed in Fig. 1, when the shaft 1 is rotated and its inclined cam end 4 operates against the flat face 6 and causes such oscillatory movement of the said driving element 5.

From the foregoing, the operation of the described structure will be readily understood. When shaft 1 is rotated, its inclined end or cam surface 4, in contact with the flat face 6 of the driving member or dog 5, will cause the driving member 5 to be oscillated within the cavity 13, or from right to left or vice versa as viewed in Fig. 1, the driving member being smoothly guided in such movement by its arcuate flange 7 being slidable in the groove 14. The driving member will not only be caused to oscillate about a vertical axis in the manner above described, but will be caused to rock or oscillate on a horizontal axis, this rocking movement being also caused by the operation of the inclined end 4 of the rotating shaft 1 on the driving member 5. Since the driving member or dog 5 is in constant close contact with the cavity 13 of the crank or loop portion 11 of the shaft 8, the last-mentioned rocking movement of the driving member or dog 5 on a horizontal axis, will be thus imparted to the shaft 8 and said shaft 8 will be thus oscillated on a similar horizontal axis.

The action of the apparatus as described is smooth and vibrationless, and to aid further in securing this desirable result, the loop or crank portion 11 on the shaft 8 is counterbalanced by the eccentric part 12 of the shaft. When the shaft 1 is rotated, the shaft 8 will be oscillated and said oscillated shaft may be coupled or connected to any means, apparatus or mechanism requiring a steady, vibrationless, oscillatory prime mover. It is also possible to utilize the driving member or dog 5 to secure both an oscillating movement about a vertical axis as well as an oscillatory or rocking movement around an axis parallel to the axis of the oscillating shaft 8.

In disclosing the mounting of the mechanical movement, it is to be understood that the frame 3 in which the parts are mounted, is illustrative since the mechanism may be incorporated in apparatus of various kinds and is illustrated in the simple form only to easily disclose its construction and operation rather than to describe its specific mounting.

Having described a single embodiment of the invention, it is obvious that the same is not to be restricted thereto, but is broad enough to cover all structures coming within the scope of the annexed claims.

What I claim is:

1. In a mechanical movement, a rotatable shaft provided with an inclined cam surface, a semi-cylindrical driving element having a cylindrical surface and a flat face, the cam surface being in intimate contact with said flat face, an oscillatable shaft having a crank portion provided with a loop cavity, said cavity having a portion complementary in shape to the cylindrical surface of the driving element, the driving element being fitted in said cavity, and guide means for guiding the driving element through an oscillatory path within said cavity when the rotatable shaft is rotated.

2. In a mechanical movement, an oscillatable shaft provided with a crank portion defining a cavity, a semi-cylindrical element disposed within the cavity and in contact with the wall surface of the same, said semi-cylindrical element having a flat face, a rotatable shaft having an inclined end retained in contact with said flat face, and guiding means for retaining the semi-cylindrical element within the cavity and permitting its oscillation in two different directions under the action of the said inclined end.

3. In a mechanical movement, a rotatable shaft having an inclined end, a semi-cylindrical driving member having a flat face disposed against said inclined end, said semi-cylindrical member also having a cylindrical surface, an oscillatable shaft having a crank formed with a surface complementary to the cylindrical surface of the driving member and against which said surface of the driving member is in contact, and guide means by which the driving member is maintained against the crank and held against displacement while oscillated in two directions.

4. In a mechanical movement as provided for in claim 3, wherein said guide means consists of an arcuate projection extending from the cylindrical surface of the driving member, and the crank is provided with a groove in which said projection is positioned and is slidable during oscillations of the driving member.

5. In a mechanical movement, a rotatable shaft formed at one end with an inclined cam surface, a semi-cylindrical driving dog having a cylindrical surface and a flat face, the cam surface being maintained in constant intimate contact with said flat face while the shaft is rotated, an oscillatable shaft having a counterbalanced crank portion provided with a loop cavity, said cavity having an arcuate portion complementary in shape to the cylindrical surface of the driving dog, the driving dog being fitted in said cavity and being oscillatory therein, and guide means on the dog and in the cavity for guiding the driving dog through an oscillatory path within said cavity when the rotatable shaft is rotated.

6. In a mechanical movement, a rotatable shaft having an inclined end, a semi-cylindrical driving member having a flat face disposed against said inclined end, said semi-cylindrical member also having a cylindrical surface, an oscillatable shaft having a crank formed with a surface complementary to the cylindrical surface of the driving member and against which said cylindrical surface of the driving member is in contact, guide means by which the driving member is maintained against the crank and held against displacement while oscillated in two directions, said guide means consisting of a flange on the driving member fitted within a complementary groove formed in the wall of the cylindrical surface of the oscillatable shaft.

7. In a mechanical movement, a rotatable element including a cam surface, a driving element having a surface in contact with the cam surface and caused to be oscillated in two directions around axes at right angles to one another by rotation of the rotatable element, an oscillatable member in engagement with the driving element and caused to be oscillated thereby upon the oscillatory movement of the driving element, said driving element being formed with a cylindrical surface and the oscillatable member having a surface complementary thereto, said last-mentioned surface being formed in a crank on the oscillatable member.

References Cited in the file of this patent

UNITED STATES PATENTS

| 2,342,467 | Hagopian | Feb. 22, 1944 |
| 2,503,159 | Lane | Apr. 4, 1950 |
| 2,557,912 | Lane | June 19, 1951 |
| 2,704,460 | Calabrese | Mar. 22, 1955 |